(12) United States Patent
Marchini et al.

(10) Patent No.: US 12,284,459 B2
(45) Date of Patent: Apr. 22, 2025

(54) METHOD TO COMPENSATE FOR PROJECTION ERRORS WHEN OUTPUTTING IMAGES, SYSTEM HAVING AN ARITHMETIC LOGIC UNIT FOR CARRYING OUT THE METHOD AND COMPUTER PROGRAM

(71) Applicant: Robert Bosch GmbH, Stuttgart (DE)

(72) Inventors: Andrea Marchini, Kusterdingen (DE); Julian Heinzelmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 92 days.

(21) Appl. No.: 18/260,428

(22) PCT Filed: Jan. 10, 2022

(86) PCT No.: PCT/EP2022/050319
§ 371 (c)(1),
(2) Date: Jul. 5, 2023

(87) PCT Pub. No.: WO2022/179761
PCT Pub. Date: Sep. 1, 2022

(65) Prior Publication Data
US 2024/0056548 A1 Feb. 15, 2024

(30) Foreign Application Priority Data
Feb. 24, 2021 (DE) ...................... 10 2021 104 346.8

(51) Int. Cl.
*H04N 5/74* (2006.01)
*G02B 27/01* (2006.01)
(52) U.S. Cl.
CPC ........... *H04N 5/74* (2013.01); *G02B 27/0172* (2013.01); *G02B 2027/0178* (2013.01)

(58) Field of Classification Search
CPC ........ G02B 27/0172; G02B 2027/0178; H04N 3/2335; H04N 5/2628; H04N 5/74; H04N 9/3185
See application file for complete search history.

(56) References Cited

U.S. PATENT DOCUMENTS 5,283,560 A * 2/1994 Bartlett ................. G06F 3/0481
345/902
5,668,572 A * 9/1997 Meyer ................ G02B 26/0841
348/742

(Continued)

FOREIGN PATENT DOCUMENTS

| DE | 69618545 T2 | 8/2002 |
|---|---|---|
| DE | 69917470 T2 | 6/2005 |
| WO | 2010062481 A1 | 6/2010 |

OTHER PUBLICATIONS

International Search Report for PCT/EP2022/050319, Issued Apr. 11, 2022.

*Primary Examiner* — Michael B. Pierorazio
(74) *Attorney, Agent, or Firm* — NORTON ROSE FULBRIGHT US LLP; Gerard A. Messina

(57) ABSTRACT

A method to compensate for projection errors when outputting images using a smart-glasses system. At least one image is produced using an arithmetic logic unit of the system. The image produced or an image to be output is transmitted by the arithmetic logic unit to a micro-electromechanical output unit, particularly smart glasses, of the system. Before the image is output by the output unit, a correction algorithm is executed to generate a corrected image to be output. Image regions of the corrected image to be output are assigned at least one stored position within the produced image via at least one stored transformation function depending in each case on a position within the corrected image to be output. At least one image-region parameter is ascertained for the (Continued)

image regions to be generated depending in each case on the stored position assigned to the respective image region to be generated.

12 Claims, 3 Drawing Sheets

(56) References Cited

U.S. PATENT DOCUMENTS

| | | | | |
|---|---|---|---|---|
| 5,680,180 A * | 10/1997 | Huang | | H04N 9/3114 |
| | | | | 348/743 |
| 6,317,128 B1 * | 11/2001 | Harrison | | G06T 15/503 |
| | | | | 345/629 |
| 6,393,145 B2 * | 5/2002 | Betrisey | | G09G 5/28 |
| | | | | 382/167 |
| 6,661,918 B1 * | 12/2003 | Gordon | | G06T 7/174 |
| | | | | 382/164 |
| 6,843,569 B2 * | 1/2005 | Hirao | | H04N 5/74 |
| | | | | 353/70 |
| 6,911,963 B2 * | 6/2005 | Baba | | H04N 9/3114 |
| | | | | 348/742 |
| 7,184,063 B2 * | 2/2007 | Shum | | G06T 11/001 |
| | | | | 345/640 |
| 7,317,830 B1 * | 1/2008 | Gordon | | G06T 7/174 |
| | | | | 382/173 |
| 7,331,677 B2 * | 2/2008 | Horiguchi | | H04N 9/3144 |
| | | | | 353/57 |
| 7,380,946 B1 * | 6/2008 | Teng | | H04N 5/74 |
| | | | | 345/611 |
| 7,441,906 B1 * | 10/2008 | Wang | | G03B 21/14 |
| | | | | 353/121 |
| 7,450,177 B2 * | 11/2008 | Lee | | H04N 7/0122 |
| | | | | 348/913 |
| 7,480,405 B2 * | 1/2009 | Poynter | | G09G 5/06 |
| | | | | 345/597 |
| 7,536,048 B2 * | 5/2009 | Moravec | | G06T 11/001 |
| | | | | 345/589 |
| 7,557,865 B2 * | 7/2009 | Minami | | H04N 5/44504 |
| | | | | 348/589 |
| 8,063,919 B2 * | 11/2011 | Mizumaki | | G01D 13/02 |
| | | | | 345/690 |
| 8,115,708 B2 * | 2/2012 | Hatalkar | | G09G 5/00 |
| | | | | 348/173 |
| 8,120,615 B2 * | 2/2012 | Gannon | | G06T 17/05 |
| | | | | 345/440.1 |
| 2001/0009445 A1 * | 7/2001 | Chung | | H04N 21/47 |
| | | | | 348/556 |
| 2002/0024640 A1 * | 2/2002 | Loka | | G03B 37/04 |
| | | | | 348/E9.027 |
| 2003/0210381 A1 * | 11/2003 | Itaki | | H04N 5/74 |
| | | | | 353/70 |
| 2005/0060669 A1 * | 3/2005 | Lowles | | G09G 5/04 |
| | | | | 715/867 |
| 2005/0117060 A1 * | 6/2005 | Minami | | H04N 9/641 |
| | | | | 348/565 |
| 2005/0156818 A1 * | 7/2005 | Tsuji | | H04N 5/44504 |
| | | | | 348/E5.1 |
| 2005/0157926 A1 * | 7/2005 | Moravec | | G06T 11/60 |
| | | | | 382/173 |
| 2005/0168705 A1 * | 8/2005 | Li | | H04N 5/74 |
| | | | | 353/69 |
| 2006/0044324 A1 * | 3/2006 | Shum | | H04N 9/76 |
| | | | | 345/595 |
| 2007/0177215 A1 * | 8/2007 | Lyapunov | | G09G 5/227 |
| | | | | 358/1.9 |
| 2007/0192164 A1 * | 8/2007 | Nong | | G06Q 30/02 |
| | | | | 725/35 |
| 2007/0253040 A1 * | 11/2007 | Lee | | H04N 1/403 |
| | | | | 358/518 |
| 2008/0276204 A1 * | 11/2008 | Lowles | | G09G 3/3216 |
| | | | | 715/867 |
| 2009/0225235 A1 * | 9/2009 | Fujisaki | | H04N 7/0122 |
| | | | | 348/E3.048 |
| 2010/0098331 A1 * | 4/2010 | Meng | | G06T 7/194 |
| | | | | 382/164 |
| 2011/0013832 A1 * | 1/2011 | Itoh | | H04N 1/58 |
| | | | | 382/167 |
| 2011/0069234 A1 * | 3/2011 | Kaise | | H04N 21/47 |
| | | | | 348/E5.077 |
| 2011/0069235 A1 * | 3/2011 | Fujisaki | | H04N 9/3185 |
| | | | | 348/E5.078 |
| 2011/0141353 A1 * | 6/2011 | Wong | | G06T 11/001 |
| | | | | 348/E7.003 |
| 2011/0164814 A1 * | 7/2011 | Onai | | G06T 7/11 |
| | | | | 382/164 |
| 2012/0019572 A1 * | 1/2012 | Lim | | G09G 5/026 |
| | | | | 345/690 |
| 2020/0142193 A1 * | 5/2020 | Graf | | G02B 3/14 |
| 2020/0143585 A1 * | 5/2020 | Seiler | | G06T 15/20 |

* cited by examiner

METHOD TO COMPENSATE FOR PROJECTION ERRORS WHEN OUTPUTTING IMAGES, SYSTEM HAVING AN ARITHMETIC LOGIC UNIT FOR CARRYING OUT THE METHOD AND COMPUTER PROGRAM

BACKGROUND INFORMATION

A method has already been provided in the related art to compensate for projection errors when outputting images with the aid of a system, whereby in at least one method step, at least one image is produced with the aid of an arithmetic logic unit of the system, and in at least one method step, the image produced or an image to be output is transmitted by way of the arithmetic logic unit to a micro-electromechanical output unit of the system.

SUMMARY

The present invention is based on a method to compensate for projection errors when outputting images with the aid of a system, particularly a smart-glasses system, whereby in at least one method step, at least one image is produced with the aid of at least one arithmetic logic unit of the system, and in at least one method step, the image produced or an image to be output is transmitted by the arithmetic logic unit to at least one micro-electromechanical output unit, particularly smart glasses, of the system.

According to an example embodiment of the present invention, in at least one method step, particularly before the image is output by the output unit, it is provided that a correction algorithm is executed to generate from the produced image, a corrected image to be output, whereby image regions, especially image points, of the corrected image to be output that are to be generated with the aid of the correction algorithm are assigned at least one stored position within the produced image via at least one stored transformation function depending in each case on a position within the corrected image to be output, at least one image-region parameter being ascertained for the image regions to be generated depending in each case on the stored position assigned to the respective image region to be generated. In particular, the at least one, especially exactly one, stored position, that is, the at least one, especially the exactly one, image region within the produced image is assigned via at least one stored transformation function to the image regions of the corrected image to be output that are to be generated with the aid of the correction algorithm, depending in each case on the position of the individual image regions to be generated within the corrected image to be output, at least one image-region parameter being ascertained for the image regions of the corrected image to be output depending in each case on the stored position, that is, on the at least one image region within the produced image assigned to the respective image region of the corrected image to be output.

The method is preferably in the form of a computer-implemented method. According to an example embodiment of the present invention, the correction algorithm is executed preferably with the aid of the arithmetic logic unit. It is also possible for the correction algorithm to be executed using a further arithmetic logic unit of the system, that is formed particularly as part of the output unit. A "produced image" is to be understood specifically as an image that is produced by the arithmetic logic unit, and that by preference, exists independently of an execution of the correction algorithm, in particular, is not processed or changed via the correction algorithm. A "corrected image" is to be understood particularly as an image generated from at least one produced image via the correction algorithm, especially the at least one transformation function, and which preferably when output with the aid of the output unit, images the produced image, utilized for generating the corrected image, essentially without projection errors on a projection surface of the output unit, e.g., a virtual surface which emulates a capture surface of an eye of a user at an intended position relative to the output unit, or a surface of a display or a glass. Notably, a projection of the corrected image, output by the output unit, on the projection surface corresponds at least essentially to the image produced by the arithmetic logic unit. A "transformation function" is to be understood specifically as a function which is furnished to convert an image, particularly the produced image, into another image, particularly the corrected image to be output, in each case at least one position, that is, one image region within the image being assigned via the function specifically to selected or all image regions of the other image. Via the assignment for generating the corrected image, preferably for each of the image regions, in each case at least one image-region parameter is ascertained, which is determined depending on image regions or image-region parameters of the produced image, that specifically are determined in each case depending on at least one assigned position, that is, one assigned image region within the produced image. In particular, the corrected image is generated from at least one produced image via the at least one transformation function. For example, the at least one transformation function is in the form of a table, a graph or the like, in each case at least one position, especially exactly one position, in a produced image, at least one image-region parameter and/or at least one change of at least one image-region parameter being assigned particularly to each image region of a corrected image to be generated, e.g., based on a placement in a column or a row of the table or based on a position on the graph. An image produced utilizing the arithmetic logic unit is formed preferably of a plurality of image regions. Each image region of the image has at least one image-region parameter. An "image region" is to be understood particularly as a region of an image which is uniquely assignable based on its position within the image and is formed as the smallest distinguishable element of the image. In one preferred embodiment, an image region of an image represents one region of the image, particularly one image point, which is displayable via exactly one pixel of a/the output unit that is equipped to output the image. Alternatively, it is possible that image regions of an image are also formed larger or smaller than an imaging area of a pixel. An "image-region parameter" is to be understood particularly as a parameter of an image region which influences and/or describes an imaging of the image region in an output image. For instance, the at least one image-region parameter is in the form of a brightness of an image region, a color value, particularly a color-value combination of an image region, a gray level of an image region, e.g., in the case of black and white images, a size of an image region or the like. In each case, an assignment of a position in the produced image for the individual image regions of the corrected image to be generated corresponds preferably to an assignment of one or more image regions within the produced image, that are located specifically at the respective position. In one exemplary embodiment, each one or selected image regions of a corrected image to be generated is/are assigned at least one position within a produced image via the at least one transformation function, at least one image-region parameter of one image region of the produced image, which is located at the assigned position, being read out for generating the corrected image and being utilized to determine an image-region parameter of the respective to-be-generated image region of the corrected image. It is possible that the read-out image-region parameter is assumed for the respective image-region parameter of the corrected image to be generated, or is adapted via an, especially additional, transformation function with the aid of a stored change of an image-region parameter. In particular, it is possible that in each case a plurality of positions, that is, image regions within/of the produced image are assigned via the at least one transformation function to individual image regions of the corrected image to be generated.

According to an example embodiment of the present invention, preferably, the at least one image is produced before the image and/or a corrected image to be output that is generated from the image is transmitted from the arithmetic logic unit to the output unit. Preferably, the at least one corrected image to be output is generated with the aid of the arithmetic logic unit before the corrected generated image to be output is transmitted from the arithmetic logic unit to the output unit. In particular, the corrected image to be output is generated on the arithmetic logic unit formed separately from the output unit. Alternatively, it is possible that the at least one produced image is transmitted from the arithmetic logic unit to the output unit before the corrected image to be output is generated using the further arithmetic logic unit, the corrected image to be output being generated particularly by the further arithmetic logic unit within the output unit. Preferably, a quantity of image regions of the at least one corrected image to be generated and to be output is selected using the correction algorithm for generating the corrected image to be output, in particular, at least one, especially exactly one, stored position within the produced image and/or at least one stored change of an image-region parameter being assigned via the transformation function to each image region of the selected quantity of image regions. Preferably, at least one image-region parameter, particularly one value of at least one image-region parameter, is set for each image region of the selected quantity of image regions of the corrected image depending on the at least one, especially exactly one, assigned stored position within the produced image and/or the at least one assigned stored change of an image-region parameter. It is possible that all subregions of the corrected image to be generated are selected with the aid of the correction algorithm for generating the corrected image to be output, or only a portion of all subregions of the corrected image is selected depending, for example, on a change of at least one image-region parameter of individual subregions of the produced image or of the corrected image.

An "arithmetic logic unit" is to be understood particularly as a unit having an information input, information processing and an information output. The arithmetic logic unit advantageously has at least one processor or the like, a memory unit formed particularly as a buffer, as an internal memory, as a virtual memory, as a storage medium or the like, input and output means, further electrical components, an operating program, closed-loop routines, open-loop routines and/or calculation routines. The components of the arithmetic logic unit are disposed preferably on one common board and/or beneficially in one common housing. An "output unit" is to be understood particularly as a unit having an information input and at least one output element for an optical output of information. A "micro-electromechanical output unit" is to be understood particularly as an output unit which uses at least one micro-electromechanical system (MEMS) for an optical output. "Equipped" is to be understood particularly as specially programmed, specially designed and/or specially furnished. The statement that an object is equipped for a specific function is to be understood especially to the effect that the object fulfills and/or carries out this specific function in at least one application state and/or operating state. A "projection error" is to be understood particularly as an unwanted change in an image, especially an image output via the output unit and imaged on a projection surface of the output unit, the projection errors being accounted for by a type of output of the output unit, by a form of the output unit and/or by ambient conditions changing or deviating from standard conditions. For example, projection errors are in the form of image distortions, particularly here and there, variations in brightness, color variations or gray-level variations or the like. Upon output of a produced image and/or a sequence of a multitude of produced images output one after the other in time, e.g., in the form of a video or the like, in particular information of one specific image region, e.g., of one image point, would be assigned to one pixel whose position in an output image is identical to a position of the image region in the produced image. Due to inaccuracies and tolerances within micro-electromechanical systems like, for example, due to a deviation of an alignment of a micromirror of the system or due to ambient conditions such as temperature differences or the like, which may influence a wavelength of output light beams, in particular distortions, color changes, variations in brightness or the like, namely, projection errors, occur in the output image. To compensate for projection errors, with the aid of the correction algorithm, in each case exactly one stored position within the produced image and/or at least one stored change of at least one image-region parameter is/are assigned preferably to the, especially all or selected, image regions of a corrected image to be generated, in particular, at least one image-region parameter of the individual image regions of the corrected image being set depending on the assigned stored position and/or the assigned stored change of the image-region parameter. Preferably, the corrected image is generated with the aid of the correction algorithm in such a way that when the generated corrected image is output by the output unit on a projection surface of the output unit, the generated image is displayed preferably without projection errors. In particular, positions of real pixels of the output unit are generally not integral. It is possible that upon transmission or output of the corrected image to be output, not just one sampling value of image information, particularly of an image-region parameter, is taken as a basis for controlling an intensity of a corresponding light source of the output unit, but rather an average value of sampling values in an area to be defined surrounding a position of a real pixel of the output unit.

According to an example embodiment of the present invention, preferably, the corrected image to be output is transmitted by way of a wireless or cabled communication unit of the system from the arithmetic logic unit to the micro-electromechanical output unit. In an alternative embodiment, the at least one produced image is transmitted by way of a wireless or cabled communication unit of the system or by way of an electric and/or electronic line from the arithmetic logic unit to the micro-electromechanical output unit, especially the further arithmetic logic unit. In particular, a corrected generated image to be output is transmitted by way of an electric and/or electronic line from the further arithmetic logic unit to at least one output element of the micro-electromechanical output unit.

According to an example embodiment of the present invention, using the correction algorithm, preferably all or the selected image regions of the corrected image to be generated, particularly image-region parameters of all or the selected image regions of the corrected image to be generated are set depending on the stored positions within the produced image assigned to the individual image regions, and/or on changes of the image-region parameter that are assigned to the individual image regions, the corrected image to be output preferably being generated. By preference, the image regions of the corrected image are set with the aid of the correction algorithm—image-region parameters of the individual image regions of the corrected image preferably being adapted or set—in such a way that the produced image is displayed on the projection surface of the output unit via an output of the corrected image to be output. In particular, projection errors due to an output of the produced image via the output unit are compensated for with the aid of the correction algorithm by setting image-region parameters of the image regions of the corrected image according to the positions, stored in the at least one transformation function, of image regions in the produced image and/or by setting or adapting the image-region parameters of the image according to the changes, stored in the at least one transformation function, of the image-region parameters. Preferably a plurality of transformation functions are utilized to generate the at least one corrected image to be output. Preferably at least a first transformation function is utilized with the aid of the correction algorithm to generate from the produced image, a corrected image to be output. Specifically, in each case at least one, especially exactly one, stored position within the produced image is assigned to all or to the selected image regions of the corrected image via the at least one first transformation function. Particularly after the first transformation function, preferably at least one second transformation function is utilized with the aid of the correction algorithm for generating the to-be-output corrected image from the produced image. Specifically, in each case at least one, especially exactly one, stored change of at least one image-region parameter is assigned via the at least one second transformation function to all or to the selected image regions of the corrected image.

According to an example embodiment of the present invention, it is possible that the output unit includes a plurality of output elements and/or is equipped to output images by way of a multiplicity of colors or through light in multiple wavelength ranges. In particular, the correction algorithm is executed via a plurality of transformation functions, in doing so, namely, in each case, at least one transformation function being utilized separately for each output element and/or each wavelength range of the output unit for an output of images. Specifically, the produced image is represented via the output unit by way of a plurality of generated corrected images. Prior to execution of the correction algorithm, in particular, the at least one produced image is divided by the arithmetic logic unit or the further arithmetic logic unit into multiple partial images depending on a number of output elements and/or different wavelength ranges of the output unit, which, preferably assembled again, yield the produced image. The correction algorithm is executed preferably for each of the partial images, in particular, a plurality of corrected partial images to be output being generated via the transformation functions. In particular, when output by the output unit, the corrected to-be-output partial images together image the produced image on the projection surface of the output unit.

The form of the method according to the present invention beneficially permits low computation effort for the compensation of projection errors in the case of images to be output. This permits advantageously great flexibility in selecting a form of the arithmetic logic unit. Notably, a beneficially robust and/or cost-effective arithmetic logic unit, for example, mass-produced processors and/or microcontrollers, may be selected for carrying out the method. Advantageously, it is possible to dispense with hardware developed specially to perform calculations for the rectification of images to be output.

In addition, according to an example embodiment of the present invention, in at least one method step for calibrating the correction algorithm, it is provided that for each image region of a corrected image to be generated, the at least one, especially exactly one, position, that is, at least one, especially exactly one, image region within a produced image and/or at least one change of at least one image-region parameter be calculated and assigned to the individual image regions by storing in the at least one transformation function. Calculations of positions of the image regions in the image to be output may advantageously be omitted during execution of the correction algorithm, particularly since only values that are already calculated have to be read out. This permits advantageously low demand on computing power for generating the corrected image to be output. Especially preferred, the correction algorithm is calibrated separately, particularly set apart in time, from an execution of the correction algorithm. By preference, the correction algorithm is calibrated at the factory during assembly of the system, especially the output unit, and/or during an initialization of the system, especially the output unit. Preferably, the correction algorithm is calibrated outside of an operation of the system, especially the output unit, furnished to output images. During the calibration of the correction algorithm, in at least one method step, preferably at least one image and at least one pattern within the image are produced and output with the aid of the output unit, an imaging of the pattern in the image on the projection surface of the output unit being sensed by at least one acquisition unit. An imaging function is determined particularly by comparing the imaging of the pattern to the produced pattern. Preferably, in at least one further method step, the pattern is projected virtually onto the sensed projection surface of the image and is transferred via an inverse transformation with the aid of the ascertained imaging function into the image to be produced. In at least one further method step, preferably the at least one, particularly bijective, transformation function is determined via a comparison of the inversely transformed pattern and the pattern within the image and/or from the inversely transformed imaging function. During the calibration of the correction algorithm, preferably in each case a transformation function is determined for a variety of different ambient conditions of the output unit, for various output parameters of the output unit such as an output direction, for example, and/or for different image parameters of the image to be output. Preferably, the ascertained transformation functions, particularly positions of the image regions of the image that are stored in the individual transformation functions and/or changes of one/multiple image-region parameters of the image regions of the image that are stored in the individual transformation functions are stored in the arithmetic logic unit or in the further arithmetic logic unit during the calibration of the correction algorithm. Preferably, in at least one method step, particularly the method step indicated above, for calibrating the correction algorithm, at least one position, that is, one image region within a corrected image to be generated and output and/or at least one change of at least one image-region parameter is calculated for each image region of a producible image, and is assigned to the individual image regions by storing in at least one, particularly a further, transformation function. In one exemplary embodiment of the present invention, in at least one method step for generating the corrected image, image-region parameters of image regions of a corrected image to be generated are set and/or adapted via one, especially another transformation function, which specifically includes stored changes of image-region parameters, depending on the stored changes of the corresponding image-region parameters. For example, to generate the corrected image, for one image region of the corrected image to be generated and output, image-region parameters, e.g., a brightness and a color value, of an image region of a produced image assigned to the image region, are read out via one transformation function and adapted, e.g., in each case reduced or increased, via another transformation function depending on changes of the image-region parameters stored in it, which specifically are assigned by the other transformation function to the image region of the corrected image. The adapted image-region parameter is then assumed/set for the image region, namely, for generating the corrected image.

In addition, according to an example embodiment of the present invention, it is provided that in at least one further method step, in executing the correction algorithm for generating the corrected image to be output, at least one image-region parameter be determined for the to-be-generated image regions of the corrected image to be output, in each case depending on at least one image-region parameter of image regions or of one image region of the produced image which is/are located at the position within the produced image assigned via the at least one transformation function to the respective image regions of the corrected image to be output. This permits beneficially rapid and computationally efficient generation of the corrected image to be output during the execution of the correction algorithm. Preferably, in at least one method step, especially the further method step, in executing the correction algorithm, for each image region or selected image regions of the corrected image to be generated, at least one image-region parameter of at least one image region of the produced image, which is located at the position within the produced image that is assigned via the at least one transformation function to the respective image region, is ascertained, in particular, at least one image-region parameter of the individual image regions of the corrected image to be generated being set depending on the ascertained image-region parameters of the image regions in the produced image. In addition, it is possible that the set image-region parameters of the individual image regions of the corrected image are adapted depending on stored changes of the respective image-region parameters assigned via a transformation function. For instance, a color value and a brightness of an image region of the image to be generated is set according to a color value and a brightness of an image region of the produced image assigned to the image region based on an assigned position in a produced image. Alternatively or additionally, it is possible that a/the set image-region parameter of an image region of the corrected image is adapted via a change of the respective image-region parameter assigned to the image region, for example, for a correction of a color value and/or a brightness of the image region.

Furthermore, according to an example embodiment of the present invention, it is provided that the correction algorithm be executed by the arithmetic logic unit, disposed separately from the output unit, before the image to be output is transmitted to the output unit. This permits an advantageously simple and cost-effective form of the output unit, especially since the correction algorithm is able to be executed via the arithmetic logic unit separate from the output unit, and the generated corrected image to be output may be transmitted to the output unit, for example, and output directly there. Moreover, the correction algorithm may be executed advantageously depending on image parameters of images produced and/or stored on the arithmetic logic unit.

According to an example embodiment of the present invention, it is further provided that, in at least one method step with the aid of the correction algorithm, particularly for each produced image, in each case image regions or subregions of the produced image are ascertained which have at least one altered image-region parameter in comparison to a stored image output previously, and by use of the correction algorithm, image regions of the corrected image to be output are ascertained via at least one further, especially bijective, transformation function, which are assigned particularly via the at least one transformation function to the ascertained image regions or subregions of the produced image, and with the aid of the correction algorithm for generating the corrected image to be output, at least one image-region parameter is ascertained in each case via the at least one, especially bijective, transformation function for only the ascertained image regions of the corrected image to be output. This permits beneficially low computing power necessary for executing the correction algorithm, particularly since it may not have to be executed for the complete produced image upon each iteration. With the aid of the correction algorithm for generating a corrected image to be output, preferably image regions of the produced image are determined which in each case have at least one image-region parameter, a difference between the image-region parameter and another image-region parameter of the respective image region extracted from the stored image output previously exceeding a predetermined limit value. Alternatively or additionally it is possible that, utilizing the arithmetic logic unit, image regions of two corrected images generated offset in time from each other are compared to ascertain image regions for an execution of the correction algorithm. With the aid of the correction algorithm for generating the at least one corrected image to be output, preferably in each case image regions of the stored image output previously, which are unchanged relative to the produced image, are joined with the ascertained image regions that were set or adapted via the correction algorithm depending on a stored position and/or according to the at least one stored change of at least one image-region parameter, whereby specifically the corrected image to be output is generated. In particular, via the further transformation function, each image region of a produced image is assigned exactly one stored position in a corrected image to be generated. For ascertained subregions of the produced image/images, preferably in each case image regions are determined which form the individual subregions in the produced image, preferably image regions in the corrected image that are to be changed, especially in each instance via the transformation function and the further transformation function, being determined for each of the ascertained image regions of the subregions of the produced image. It is possible that a number of ascertained image regions of the produced image which in each case have at least one altered image-region parameter in comparison particularly to a stored image output previously, may differ from a number of image regions of the produced image assigned to the ascertained image regions of the corrected image via the transformation function, for example, if multiple positions or image regions within the produced image are assigned via the transformation function to individual image regions of the corrected image. Preferably, for such a form of the corrected image, ascertainment of image regions necessary for representing the change of the produced image relative to the image output previously may be facilitated via the transformation function and the further transformation function, only the ascertained image regions of the corrected image, especially image-region parameters of the ascertained image regions of the corrected image, having to be adapted depending on the image regions of the produced image assigned to these image regions via the transformation function. Alternatively, it is possible that in each case exactly one position, that is, exactly one image region and/or exactly one change of an image-region parameter is/are assigned to each image region in each instance via the/one of the transformation functions, in particular, the transformation function(s) being formed bijectively.

In addition, according to an example embodiment of the present invention, particularly for generating the corrected image, it is provided that in at least one method step, the at least one transformation function be selected via the correction algorithm from a plurality of stored transformation functions depending on at least one ambient condition of the output unit, at least one output parameter of the output unit and/or at least one image parameter of the produced image or of the corrected image to be output. It is possible that via the correction algorithm particularly for generating the corrected image, a multiplicity of transformation functions is selected in each case from the plurality of stored transformation functions depending on at least one ambient condition of the output unit, at least one output parameter of the output unit and/or at least one image parameter of the produced image or of the corrected image to be output. This permits an advantageously simple adaptation of the to-be-output corrected image, to contents of the produced image, to a type and/or use of the output unit and/or to changing ambient conditions of the output unit. Beneficially great flexibility of the computer-implemented method may be attained in terms of a device or system to be used for carrying out the method. An "ambient condition" is to be understood particularly as at least one parameter or a set of parameters which describes and/or defines an area surrounding the output unit, especially with regard to aspects influencing the optical output by the output unit such as temperature, air pressure, external light irradiation or the like. An "output parameter" is to be understood particularly as a parameter characteristic for an output by the output unit, which preferably is relevant for a user's viewing of a projection surface of the output unit. For example, the output parameter of the output unit is in the form of an alignment of the output unit in space, particularly a viewing direction of a user wearing the output unit, a distance of the projection surface of the output unit from an output element of the output unit or from a user, or the like. An "image parameter" is to be understood particularly as a parameter of an image produced or to be output, which is necessary for the output of the image and which influences an output of the image by the output unit. For example, the image parameter of the image is in the form of a wavelength range necessary for the output of the respective image, a color spectrum necessary for the output of the respective image, especially a number of different wavelength ranges necessary, a resolution necessary and/or set for the output of the image, particularly on the projection surface of the output unit. In particular, in at least one method step, the at least one ambient condition of the output unit, the at least one output parameter of the output unit and/or the at least one image parameter of the image to be output is/are determined with the aid of at least one acquisition unit of the system. Alternatively, it is possible that the at least one image parameter of the image to be output is determined for a produced image with the aid of the arithmetic logic unit. Alternatively or additionally, it is possible that the at least one ambient condition of the output unit, the at least one output parameter of the output unit and/or the at least one image parameter of the image to be output is/are queried and/or received with the aid of the system, particularly the arithmetic logic unit and/or the output unit, from an external unit. Preferably, exactly one ambient condition of the output unit, exactly one output parameter of the output unit and/or exactly one image parameter of the image to be output, or exactly one value or value range of an ambient condition of the output unit, exactly one value or value range of an output parameter of the output unit and/or exactly one value or value range of an image parameter of the image to be output is/are assigned to each stored transformation function, particularly during the calibration and/or when storing the respective transformation function.

According to an example embodiment of the present invention, it is further provided that in at least one method step, a frequency for executing the correction algorithm to generate corrected images to be output be determined depending on a number of subregions, changing within a time interval, of produced images and/or image regions of produced images. An expediently direct adaptation of the correction algorithm, that is, an execution of the correction algorithm, to a content of images to be output may be attained. Beneficially low computing power necessary for executing the correction algorithm may be achieved, especially since execution of the correction algorithm may possibly be omitted advantageously for some produced images, for example, when a produced image changes only insignificantly or not at all in comparison to an image produced directly before it in time, so that preferably a corrected image generated previously may be output. By preference, the correction algorithm is executed periodically using the arithmetic logic unit or the further arithmetic logic unit, preferably depending on a number of produced images. In particular, images are produced by the arithmetic logic unit with a predetermined frequency. It is possible that the correction algorithm is executed with the predetermined frequency with which the images are produced, namely, exactly once for each produced image. It is possible that a rate of change of the produced images is less than the predetermined frequency with which the images are produced, or that with each produced image, only one subregion or a portion of all image regions of the produced image is changed. With the aid of the correction algorithm, changes in individual produced images or altered subregions of an individual produced image in each case are ascertained preferably via a comparison to an image produced previously. In particular, changes in produced images are collected and stored with the aid of the arithmetic logic unit or the further arithmetic logic unit. It is possible that the correction algorithm is not executed until a number of collected changes exceeds a predetermined limit value, for instance, if the produced image has changed over two or more produced images and/or in more than two subregions. The correction algorithm is executed particularly if the predetermined limit value for all collected changes is exceeded, at least one image to be output being generated.

Alternatively or additionally, it is possible to execute the correction algorithm depending on a size of the changing subregions in the produced images. For example, the correction algorithm is executed if at least one ascertained changing subregion of a produced image extends over more than two or more pixels situated next to each other.

In addition, according to an example embodiment of the present invention, it is provided that in at least one method step, the at least one image produced and/or transmitted to the output unit be stored, only a portion of the image regions forming the image being selected and stored when storing the image, and in at least one further method step, especially in a further iteration of the correction algorithm, the stored image is assembled by way of the selected portion and by way of an interpolation of the image regions forming the portion or subregions. This permits beneficially small storage volume for storing an image. An advantageously cost-effective and compact form of a memory unit may thus be attained. Preferably, each produced image is stored in the arithmetic logic unit or the further arithmetic logic unit, especially for a comparison to other produced images in order to ascertain changes within a produced image. Alternatively or additionally, it is possible to store only changing subregions or image regions of produced images. For example, the image regions forming the portion may be interpolated via a rendering by, e.g., triangular or quadrangular polygons, the stored image being utilized especially as texture. Image regions outside of the portion may thus be interpolated.

In addition, according to an example embodiment of the present invention, it is provided that in at least one method step, particularly independently of the correction algorithm, at least one operator be applied to at least one transformation function depending on at least one user input, in doing so, at least one position—stored via the transformation function— of one image region of a produced image or of a corrected image and/or at least one change—stored via the transformation function—of one image-region parameter of at least one image region of a corrected image being set. This facilitates beneficially high user-friendliness. An advantageously individual setting of output images may be made possible. Fine adjustments of output images to user-specific requirements, which are necessitated, e.g., owing to the ability of a user to take things in, a shape of the user's head or the like, may easily be facilitated. An "operator" is to be understood particularly as an instruction which is provided for use on a part, i.e., one or more entries of a transformation function or on the entire transformation function. For example, the operator is in the form of an addition or subtraction of a value with respect to one or more values of the at least one transformation function, or a percentage increase or decrease of one or more values of the at least one transformation function. For example, the operator, especially a value of the operator, is predetermined stepwise and/or is set via the user input. In particular, the user input and a use of the operator take place independently of an execution of the correction algorithm. It is possible that an execution of the correction algorithm is paused for the use of the operator, or that the operator is applied to the at least one transformation function during an iteration of the correction algorithm, the transformation function being adapted after the iteration of the correction algorithm, particularly prior to a further iteration of the correction algorithm. In particular, at least one position—stored via the transformation function—of an image region of a corrected image and/or of a produced image and/or at least one change— stored via the transformation function—of at least one image-region parameter for at least one image region of a corrected image is set or adapted via the application of the operator to a transformation function. It is possible that via a user input, a large number of operators are applied to at least one stored transformation function or a plurality of stored transformation functions, for example, in order to set complex changes such as an image sharpness, a gamma correction or the like in the corrected image to be output. Particularly for individual complex changes, in each case a predetermined group of operators to be applied is selected, in doing so, in each instance different change steps of these operators being selected for a stepwise setting of the respective complex change in the corrected image to be output, and applied to the at least one transformation function. In particular, the at least one operator is applied to the at least one transformation function with the aid of the arithmetic logic unit or the further arithmetic logic unit.

In addition, according to an example embodiment of the present invention, a system is provided, particularly a smart-glasses system, having an arithmetic logic unit, namely, the arithmetic logic unit previously indicated, and/or a further arithmetic logic unit, namely, the arithmetic logic unit previously indicated, for carrying out a method, especially a computer-implemented method, according to the present invention, and having at least one micro-electromechanical output unit, namely, the micro-electromechanical output unit previously indicated, particularly a pair of smart glasses.

According to an example embodiment of the present invention, the output unit is designed preferably as a scanning projection device for displaying discreetly stored or transmitted image information, whose scanning beam is made up of multiple beam components from different light sources. In particular, the output unit is in the form of smart glasses, e.g., intelligent glasses, 3-D glasses, virtual reality glasses, augmented reality glasses or the like. The output unit preferably includes at least one laser projector, which is in the form of a micro-electromechanical system. The output unit preferably includes a plurality of output elements, formed as light sources, particularly pulsed light sources, which are guided to the at least one projection surface of the output unit for an output of images. Specifically, the light sources are each in the form of laser-point sources. However, other forms of the light sources are possible, as well. Preferably the output unit, especially the laser projector, includes a plurality of micro-electromechanical components such as micromirrors, beam splitters, etc., which are furnished for representing images from light of the output elements. Micro-electromechanical components in particular are susceptible to environmental influences such as external sources of radiation, temperature differences, etc., whereby projection errors may occur in output images. Especially preferred, the correction algorithm is furnished to compensate for projection errors in images to be output, via a transformation of produced images, in particular, corrected images to be output being generated from produced images. In one preferred development, the output unit is equipped to project images, particularly generated corrected images, directly onto the projection surface formed as virtual surface, which emulates a capture surface of an eye of a user, at a predetermined position of an eye of a user, whereby preferably via the individual generated corrected images, in each case an image produced with the aid of the arithmetic logic unit is imaged on the projection surface, notably, at least essentially without projection errors.

According to an example embodiment of the present invention, the arithmetic logic unit is formed preferably as part of a computer, a games console, a smart phone or some other device which outputs images. By preference, the arithmetic logic unit includes at least one processor, a microcontroller, an FPGA, or the like. It is possible for the arithmetic logic unit to be in the form of a GPU. The arithmetic logic unit is equipped preferably to produce images, which are furnished especially for output via the output unit. For example, the images produced are formed as part of an application to be output via the output unit, such as a film, a computer game, a presentation, an interface laid over an environment or the like. The arithmetic logic unit is equipped particularly to transmit produced images to the output unit, especially via the communication unit. In one preferred development, the arithmetic logic unit is equipped to execute the correction algorithm. Preferably, the arithmetic logic unit is equipped to generate from produced images, corrected images to be output, via the correction algorithm. Specifically, the arithmetic logic unit is equipped to transmit the generated corrected images to be output, to the output unit, preferably via the communication unit. In an alternative embodiment, the further arithmetic logic unit is equipped to execute the correction algorithm. The further arithmetic logic unit is formed particularly as part of the output unit and is connected electrically and/or electronically to the laser projector and the output elements of the output unit, respectively. The arithmetic logic unit is equipped preferably to transmit the produced images to the further arithmetic logic unit for the generating of corrected images to be output. Preferably, the arithmetic logic unit and/or the further arithmetic logic unit include(s) a/the memory unit for storing images and transformation functions.

The design of the system according to an example embodiment of the present invention may permit an advantageously cost-effective and compact form of the system, since especially thanks to the computer-implemented method, it is possible to achieve beneficially low demands on the arithmetic logic unit with respect to computing power. An advantageously light and compact design of the output unit may be attained, especially since the computer-implemented method may be carried out completely on an arithmetic logic unit located separately from the output unit. An advantageously low computation effort to compensate for projection errors in images to be output is made possible. As a result, beneficially great flexibility may be achieved in selecting a form of the arithmetic logic unit. In particular, a beneficially robust and/or cost-effective arithmetic logic unit, for example, mass-produced processors and/or microcontrollers, may be selected for carrying out the method. Advantageously, it is possible to dispense with hardware developed specially to perform calculations for the rectification of images to be output.

In addition, according to an example embodiment of the present invention, it is provided that the system include at least one, particularly the previously indicated, wireless or cabled communication unit, the arithmetic logic unit and the output unit being formed separately from each other and being connected to each other from the standpoint of information technology via the communication unit, the arithmetic logic unit being equipped to transmit generated corrected images to be output, to the output unit. An advantageously light and compact design of the output unit may be made possible, especially since projection errors may be compensated for before the images to be output are transmitted to the output unit, and consequently, an additional arithmetic logic unit as part of the output unit may advantageously be omitted. Preferably, the further arithmetic logic unit, which is formed as part of the output unit, may be omitted or may be given a beneficially compact and cost-effective design. It is possible that the output unit includes at least one operator control element for the input of operator commands. In particular, it is possible that the operator control element is provided to transmit operator commands as user input to the further arithmetic logic unit or via the communication unit to the arithmetic logic unit.

In addition, according to an example embodiment of the present invention, a computer program is provided that includes commands which, upon execution of the program by an arithmetic logic unit, prompt it to carry out a method, especially computer-implemented method, according to the present invention or individual or multiple method steps of a method, especially computer-implemented method, according to the present invention. Preferably, the computer program includes the correction algorithm. Preferably, the computer program includes the at least one transformation function or at least information for a query of the at least one transformation function, e.g., from a device integrated in the network, from the Internet or the like.

According to an example embodiment, the form of the computer program according to the present invention permits beneficially low computation effort for the compensation of projection errors in images to be output. Advantageously, this allows great flexibility in selecting a form of the arithmetic logic unit. In particular, a beneficially robust and/or cost-effective arithmetic logic unit, for example, mass-produced processors and/or microcontrollers, may be selected for carrying out the method. Advantageously, it is possible to dispense with hardware developed specially to perform calculations for the rectification of images to be output. The form of the computer program according to the present invention makes it possible to carry out the computer-implemented method on frequently used arithmetic logic units such as processors or GPUs, preferably independently of specially furnished hardware. Thus, an advantageously cost-effective system may be attained for the output of images. Moreover, the computer-implemented method may be carried out directly on an image-producing device such as a computer, a games console or the like. This permits beneficially great flexibility with respect to a range of application of the computer-implemented method.

The method according to the present invention, the system according to the present invention and/or the computer program according to the present invention is/are not intended to be limited to the use and specific embodiment described above. In particular, in order to fulfill a mode of operation described herein, the method of the present invention, the system of the present invention and/or the computer program of the present invention may have a number of individual elements, components and units as well as method steps differing from a number indicated herein. In addition, in the case of the value ranges indicated in this disclosure, values lying within the indicated limits are also to be regarded as disclosed and usable as desired.

BRIEF DESCRIPTION OF THE DRAWINGS

Further advantages are derived from the following description of the figures. One exemplary embodiment of the present invention is represented in the figures. The figures and the description contain numerous features in combination. One skilled in the art will expediently consider the features individually, as well, and combine them to form further useful combinations.

DETAILED DESCRIPTION OF EXAMPLE EMBODIMENTS

Figure 1:
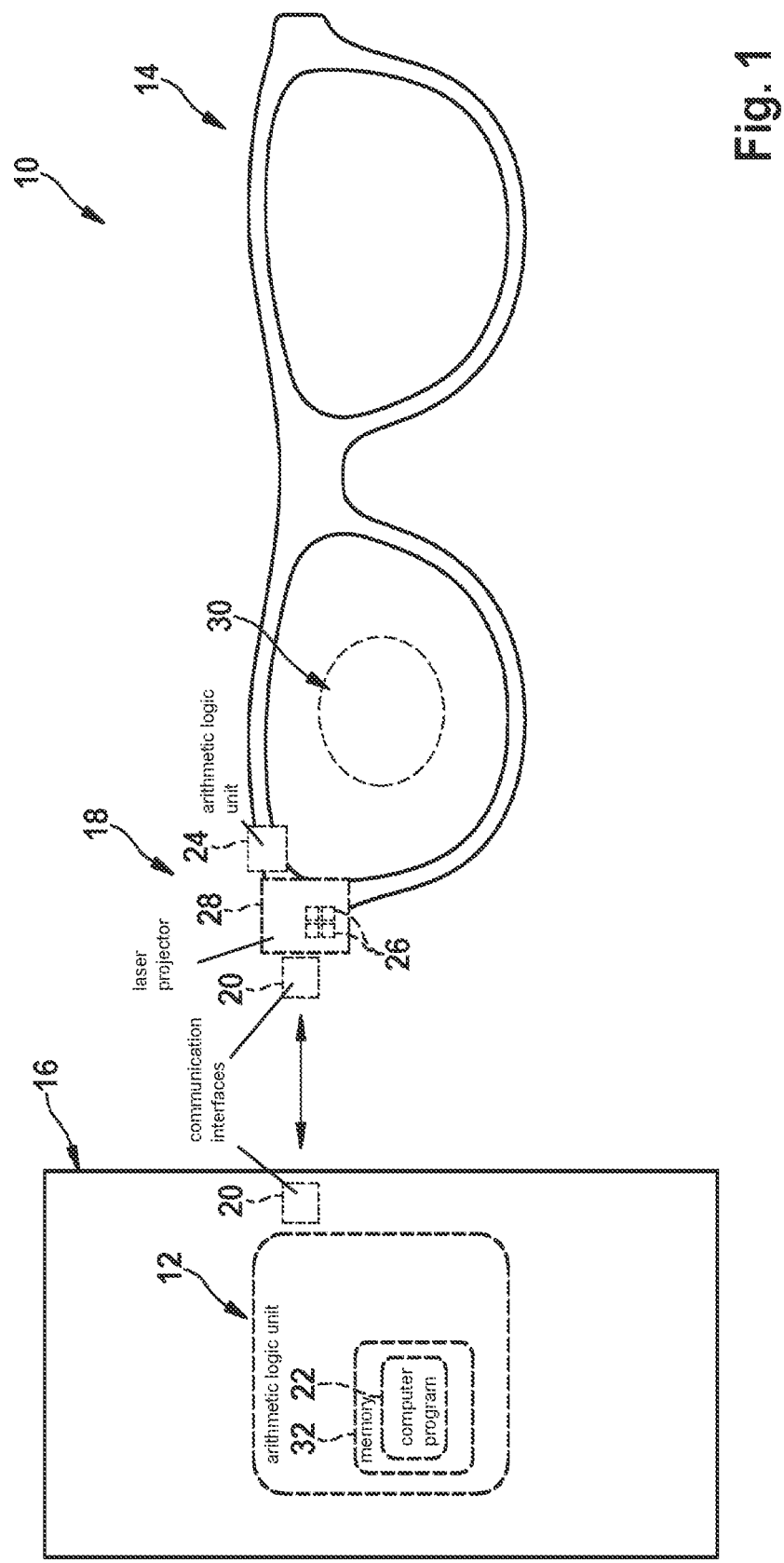
FIG. 1 shows a schematic representation of a system according to an example embodiment of the present invention for the output of images and for carrying out a method according to an example embodiment of the present invention to compensate for projection errors when outputting images.

FIG. 1 shows a schematic representation of a system 10. System 10 is in the form of a smart-glasses system. System 10 includes an arithmetic logic unit 12 and an output unit 14 formed as smart glasses. For example, output unit 14 is in the form of intelligent glasses, 3-D glasses, virtual reality glasses, augmented reality glasses or the like. Arithmetic logic unit 12 is designed as part of a device 16, which is in the form of a computer, for example. Device 16 may be formed as part of system 10. Other embodiments of device 16 are also possible, for example, as a games console, a smart phone, a server or a cloud or the like. Arithmetic logic unit 12 and output unit 14 are formed separately from each other. System 10 includes a communication unit 18 which is furnished particularly for wireless transmission of data between arithmetic logic unit 12 and output unit 14. In particular, communication unit 18 includes two communication interfaces 20, which are connected respectively to output unit 14 or arithmetic logic unit 12. Alternatively, it is possible for communication unit 18 to be cabled, device 16, particularly arithmetic logic unit 12, and output unit 14 being connected to each other via at least one cable. Arithmetic logic unit 12 and output unit 14 are connected to each other from the standpoint of information technology via communication unit 18. Arithmetic logic unit 12 is equipped to produce images which, for example, are part of an application such as a film, a game or the like, executed via device 16, especially arithmetic logic unit 12. System 10 is equipped to carry out a method 100 to compensate for projection errors when outputting images. System 10 includes a computer program 22 that includes commands which, upon execution of the program by an arithmetic logic unit, especially arithmetic logic unit 12 of device 16, prompt it to carry out method 100. Method 100 is in the form of a computer-implemented method. Arithmetic logic unit 12 is equipped to execute computer program 22. Computer program 22 includes a correction algorithm which is executed or able to be executed as part of method 100 with the aid of arithmetic logic unit 12. Arithmetic logic unit 12 is equipped to transmit corrected images to be output, generated via the correction algorithm, to output unit 14 via communication unit 18.

Alternatively or additionally, it is possible that system 10, particularly output unit 14, includes a further arithmetic logic unit 24 that is mounted on output unit 14 or is formed as part of output unit 14. It is possible that further arithmetic logic unit 24 is equipped to execute the correction algorithm. Specifically, arithmetic logic unit 12 in the alternative embodiment is equipped to transmit produced images via communication unit 18 to output unit 14, especially further arithmetic logic unit 24, corrected images to be output being generated via the correction algorithm with the aid of further arithmetic logic unit 24. Further arithmetic logic unit 24 is provided especially to transmit generated corrected images to be output, to at least one output element 26 of output unit 14 for output.

Output unit 14 includes a laser projector 28 in the form of a micro-electromechanical system and a plurality of output elements 26. Output elements 26 in each case are formed as pulsed light sources, which are guided to at least one projection surface 30 of output unit 14 for an output of images. Light pulses output by output elements 26 are intended to be guided via mirrors and reflection surfaces, especially via at least one lens of output unit 14, to projection surface 30. Projection surface 30 is in the form of a virtual surface which is located at an intended position of an eye of a user and emulates a capture surface of the eye of the user. Output unit 14 is equipped to output the generated corrected images directly to the eye of the user. Output unit 14 is equipped to output the generated corrected images in such a way that in each case, an image produced by arithmetic logic unit 12 is imaged, notably, at least essentially without projection errors, on projection surface 30 via the individual corrected images. In particular, through the output of corrected images, generated with the aid of the correction algorithm, onto projection surface 30, the images produced by arithmetic logic unit 12 are visible for the user without projection errors. Output unit 14, especially laser projector 28, includes a plurality of micro-electromechanical components such as micromirrors, beam splitters, etc., which are furnished for representing images from light of output elements 26 (not shown in figures). The correction algorithm is furnished to compensate for projection errors in images of laser projector 28 to be output, via a transformation of produced images into corrected images, in so doing, namely, corrected images to be output being generated from produced images via transformation functions. However, other forms of output unit 14 are possible, as well. In order to generate a corrected image to be output, the correction algorithm is equipped, via stored transformation functions, to assign in each instance at least one or exactly one stored position within the produced image and/or at least one stored change of at least one image-region parameter, to image regions of a corrected image to be generated and output, in each case depending on a position of the individual image regions within the corrected image. The transformation functions, that is, a plurality of transformation functions, are stored in arithmetic logic unit 12, particularly in a memory unit 32 of arithmetic logic unit 12. The transformation functions in each case are in the form of a table. However, other forms of the transformation functions are also possible, e.g., as graphs. In the alternative design of the system described above, further arithmetic logic unit 24 preferably likewise includes at least one memory unit. Alternatively, it is possible that output unit 14 is equipped to image the produced images, essentially without projection errors, through an output of the generated corrected images on a projection surface 30 formed as a surface of a glass or a display or the like.

Figure 2:
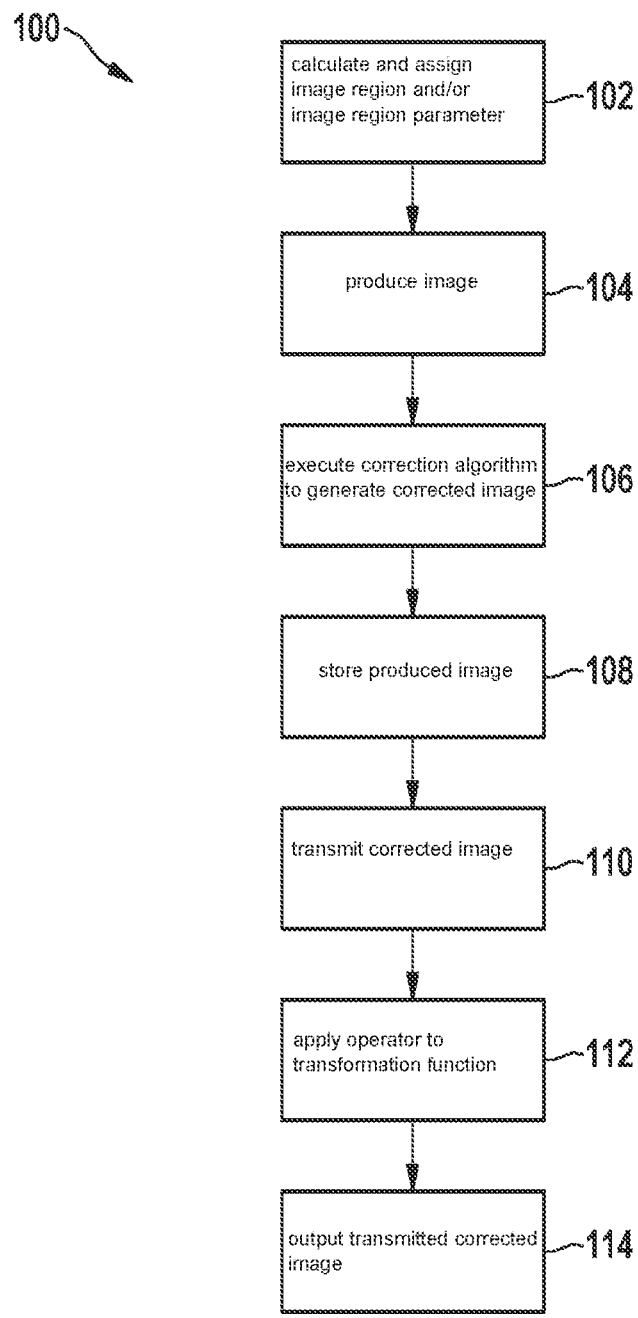
FIG. 2 shows a schematic representation of an exemplary functional sequence of the method according to an example embodiment of the present invention.

FIG. 2 shows schematically an exemplary functional sequence of method 100 to compensate for projection errors when outputting images with the aid of system 10. In a step 102 of method 100, in order to calibrate the correction algorithm, for each image region of a corrected image to be generated, at least one, especially exactly one, position, that is, at least one, especially exactly one, image region within a producible image and/or at least one change of at least one image-region parameter is/are calculated and assigned to the individual image regions by storing in a transformation function. Preferably, in at least one step of method 100, particularly method step 102, in order to calibrate the correction algorithm, for each image region of a producible image 34, at least one position, that is, one image region within a corrected image 36 to be generated and output and/or at least one change of at least one image-region parameter is/are calculated and assigned to the individual image regions by storing in at least one further transformation function. Preferably, a multitude of different transformation functions are created in analogous manner, in each case under certain conditions such as ambient conditions of output unit 14, output parameters of output unit 14 and/or image parameters of the image to be output, and are stored in the arithmetic logic unit, in each case at least one ambient condition of output unit 14, at least one output parameter of output unit 14 and/or at least one image parameter of the image to be output being assigned to each transformation function. In a further step 104 of method 100, at least one image 34 (see exemplary FIG. 3) is produced with the aid of arithmetic logic unit 12 of system 10.

In a further step 106 of method 100, the correction algorithm is executed for generating a corrected image 36 to be output (see FIG. 3 as an example) from produced image 34, whereby image regions, particularly image points, of corrected image 36 to be output that are to be generated with the aid of the correction algorithm are assigned at least one, especially exactly one, stored position, that is, at least one, especially exactly one, image region within produced image 34, via the stored transformation functions depending in each case on a position of the individual image regions to be generated within corrected image 36 to be output, at least one image-region parameter being determined for the image regions of corrected image 36 to be output, in each case depending on the stored position, that is, the at least one image region within produced image 34, assigned to the respective image region of corrected image 36 to be output. The correction algorithm is executed with the aid of arithmetic logic unit 12, disposed separately from output unit 14, before image 36 to be output is transmitted to output unit 14. In one step of method 100, particularly method step 106, in each case the transformation functions are selected via the correction algorithm from a plurality of stored transformation functions depending on at least one ambient condition of output unit 14, at least one output parameter of output unit 14 and at least one image parameter of image 36 to be output. Preferably, in each instance the ambient condition of output unit 14, the output parameter of output unit 14 and/or the image parameter of image 36 to be output is/are determined with the aid of output unit 14 and/or with the aid of an external unit (not shown in figures), and transmitted specifically via communication unit 18 to arithmetic logic unit 12. In one step of method 100, especially method step 106, in executing the correction algorithm, for each image region of corrected image 36 to be generated and output, at least one, especially exactly one, calculated stored position, that is, a calculated stored image region within a produced image 34 is read out via the transformation functions, image-region parameters of the image regions of corrected image 36 for generating corrected image 36 to be output being set depending on image-region parameters of image regions of produced image 34, which in each case are located at the read-out position. In one step of method 100, particularly method step 106, in executing the correction algorithm, changes of one or more image-region parameters are read out via the transformation functions for each image region of corrected image 36 to be generated, in each instance preferably one value of the corresponding image-region parameters of the individual image regions for generating corrected image 36 to be output being set or adapted, in each case according to the read-out changes of the image-region parameters. In one step of method 100, particularly method step 106, utilizing the correction algorithm, image regions or subregions of produced image 34 are determined specifically for produced image 34, which have at least one altered image-region parameter compared to a stored image output previously, and using the correction algorithm, image regions of corrected image 36 to be output are determined via the further, especially bijective, transformation function, which are assigned specifically via the at least one transformation function to the ascertained image regions or subregions of produced image 34, and with the aid of the correction algorithm for generating corrected image 36 to be output, at least one image-region parameter is ascertained in each case via the, especially bijective, transformation functions only for the ascertained image regions of corrected image 36 to be output. Preferably, the correction algorithm is executed based on an output frequency of arithmetic logic unit 12 or of output unit 14, in particular, the correction algorithm being executed exactly once for each produced image 34. It is also possible that in one step of method 100, particularly method step 106, a frequency for executing the correction algorithm for generating corrected images 36 to be output is determined depending on a number of subregions—changing within a time interval—of produced images 34 and/or image regions of produced images 34, the frequency being set particularly during an implementation of method 100.

In a further step 108 of method 100, produced image 34 is stored particularly prior to or upon transmission of data to output unit 14, by arithmetic logic unit 12. In addition, it is possible that generated corrected image 36 to be output is stored at least partially with the aid of arithmetic logic unit 12. In one step of method 100, particularly method step 108, produced image 34 is stored, in doing so, only a portion of the image regions forming produced image 34 being selected and stored when storing produced image 34. Preferably, in another step of method 100 (not shown in figure) in a further iteration of the correction algorithm, e.g., in a method step analogous to method step 106 or method step 104, stored image 34 is assembled by way of the selected portion and by way of an interpolation of the image regions forming the portion, e.g., for a comparison to another produced image (see method step). In a further step 110 of method 100, corrected image 36 to be output is transmitted with the aid of arithmetic logic unit 12 to micro-electromechanical output unit 14 of system 10.

In another step 112 of method 100, particularly outside of the correction algorithm, at least one operator is applied to at least one of the transformation functions depending on at least one user input, in so doing, at least one position, stored via the transformation functions, of an image region of produced image 34 and/or of corrected image 36 and/or at least one change, stored via the transformation functions, of at least one image-region parameter of an image region of produced image 34 and/or of corrected image 36 being set.

In a further step 114 of method 100, transmitted corrected image 36 is output via output unit 14, especially laser projector 28 and/or output elements 26, onto projection surface 30, in particular, an imaging 40 (see exemplary FIG. 3) of the corrected image being displayed on projection surface 30. Notably, imaging 40 represents originally produced image 34 without projection errors.

Alternatively, it is possible that in one step of method 100, particularly method step 106, by using the correction algorithm, in each case changes in individual produced images 34 or altered subregions of an individual produced image 34 are ascertained via a comparison to a previously produced image and collected, the correction algorithm not being executed until a number of collected changes exceeds a predetermined limit value, for instance, if produced image 34 has changed over two or more produced images 34 and/or in more than two or more subregions of produced image 34. It is possible that a rate of change of produced images 34 is less than the predetermined frequency with which images 34 are produced, or that with each image 34 produced, only one subregion of produced image 34 is changed. Specifically, changes ascertained by arithmetic logic unit 12 in produced images 34 are collected and stored. The correction algorithm is executed particularly if the predetermined limit value for all collected changes is exceeded, a corrected image 36 to be output being generated. Alternatively or additionally, it is possible that the correction algorithm is executed depending on a size of changing subregions in produced images 34. The ascertained changes are collected preferably in a virtual list stored particularly in arithmetic logic unit 12. Preferably, the virtual list is emptied after an iteration has ended or after the correction algorithm has been executed. The predetermined limit value represents a maximum size of the virtual list. It is possible that multiple predetermined limit values exist, and/or that ascertained changes are weighted in terms of an exceeding of the limit value(s), depending on their position in produced image 34 and/or a number of image regions of produced image 34 that are affected by the change. If a further image is produced with the aid of arithmetic logic unit 12, image regions altered by arithmetic logic unit 12 relative to previously produced image 34 are ascertained and collected, i.e., stored in the virtual list. In particular, if multiple changes are collected/stored for one image region of image 34, then a temporally older change of the image region is overwritten. If the/one of the predetermined limit value(s) is exceeded, preferably the correction algorithm is executed by arithmetic logic unit 12, in particular the collected changes of produced image 34, especially from the virtual list, being utilized for generating a corrected image 36 to be output.

Figure 3:
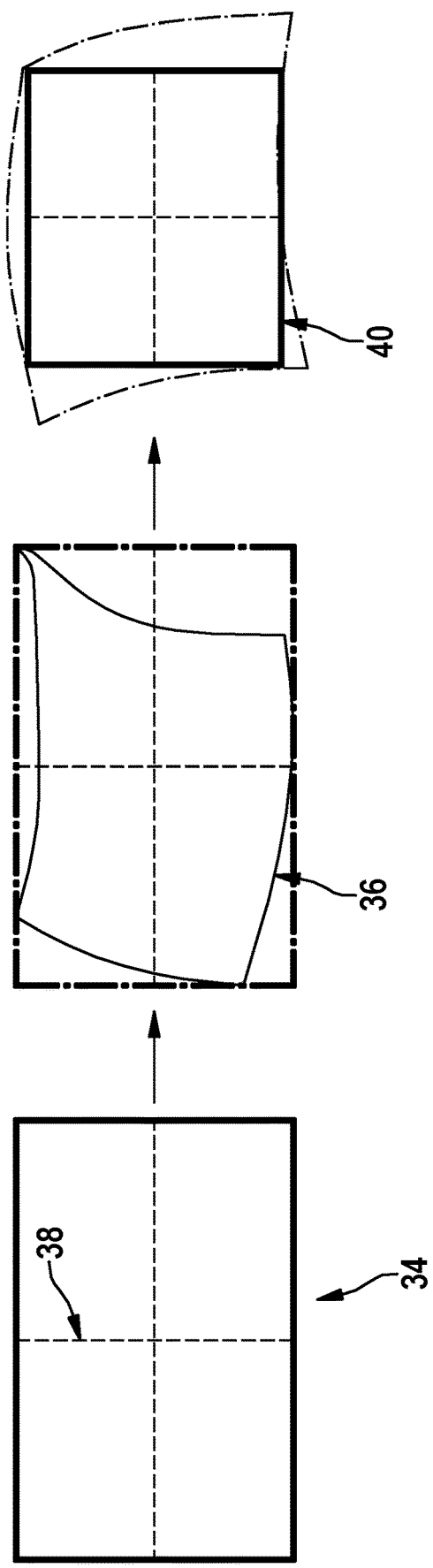
FIG. 3 shows a schematic representation of an exemplary image after being produced, as well as with and without compensation of projection errors in the output with the aid of the method according to the present invention.

As an example, FIG. 3 shows a produced image 34 (left side) which specifically includes a pattern 38, a corrected image 36 (center) generated via the correction algorithm from produced image 34, as well as an imaging 40 of corrected image 36 (right side) output via output unit 14 onto projection surface 30 of output unit 14. Notably, pattern 38 of produced image 34 is represented within imaging 40 without projection errors. In the case of corrected image 36 to be output, in addition, original pattern 38 is stored specifically for the comparison. In the case of imaging 40, in addition, generated corrected image 36 is stored for the comparison. FIG. 3 shows a simple pattern 38 as an example, method 100 being usable analogously for complex images, as well. Preferably, by using the correction algorithm, at least one corrected image is generated for each wavelength that is needed for a produced image formed of multiple partial images, and that in each case is output via one of output elements 26 of output unit 14. Using the correction algorithm, for each corrected image thus to be generated, in each case preferably a position of one image region of the corrected image to be generated assigned to the respective image region of the produced image is ascertained via a further transformation function for each image region changing in the produced image, preferably at least one image-region parameter of the image region of the corrected image having to be set or adapted for representing the change of the produced image in the projection surface of the output unit. Preferably, the further transformation function is furnished for assigning a position of one image region in a produced image to at least one, especially exactly one, position, that is, one image region in the corrected image. Preferably, with the aid of the correction algorithm, in each case at least one position of one image region of the produced image or a plurality of image regions of the produced image is assigned via the transformation function to each image region of the corrected image to be altered, the transformation function being furnished particularly for assigning image regions of the corrected image to in each case at least one position, that is, to at least one image region of the originally produced image. Utilizing the correction algorithm, preferably for each changing image region, in each case at least one stored change of at least one image-region parameter is assigned via a third transformation function to the image regions, the respective image-region parameter of the individual image regions of the corrected image being adapted or set according to the respective assigned change. In a further method step, with the aid of the correction algorithm, image-region parameters of the image regions to be changed in the corrected image are ascertained, depending on image-region parameters of image regions of the produced image which in each case are located at the ascertained positions in the produced image, and depending on the stored changes of the image-region parameters. In particular, utilizing the correction algorithm, an altered corrected image to be output is generated by joining together the changing image regions of the corrected image, which in each case have the ascertained image-region parameters, and unvarying image regions which, specifically, are not assigned any changing image regions of the produced image.

What is claimed is:

1. A method to compensate for projection errors when outputting images using a smart-glasses system, the method comprising the following steps:

producing at least one image using at least one arithmetic logic unit of the system;

transmitting the image produced or an image to be output by the arithmetic logic unit to at least one microelectromechanical output unit including smart glasses of the system; and before the image is output by the output unit, executing a correction algorithm to generate, from the produced image, a corrected image to be output, each respective image region of image regions of the corrected image to be output that are to be generated using the correction algorithm being assigned at least one stored position within the produced image via at least one stored transformation function each depending on a position within the corrected image to be output, and at least one image-region parameter being ascertained for the image regions to be generated each depending on the stored position assigned to the respective image region to be generated.

2. The method as recited in claim 1, wherein, to calibrate the correction algorithm, for each image region of a corrected image to be generated, the at least one position within a produced image and/or at least one change of at least one image-region parameter is calculated and assigned to the individual image regions by storing in the at least one transformation function.

3. The method as recited in claim 2, wherein, in executing the correction algorithm for generating the corrected image to be output, at least one image-region parameter is ascertained for the image regions of the corrected image to be output that are to be generated, in each case depending on at least one image-region parameter of image regions or of one image region of the produced image, which is located at the position within the produced image assigned via the at least one transformation function to the image regions of the corrected image to be output.

4. The method as recited in claim 1, wherein the correction algorithm is executed by the arithmetic logic unit, disposed separately from the output unit, before the image to be output is transmitted to the output unit.

5. The method as recited in claim 1, wherein, using the correction algorithm, specifically for each produced image, image regions or subregions of the produced image are ascertained which have at least one image-region parameter that is altered in comparison to a stored image output previously, and using the correction algorithm, image regions of the corrected image to be output are ascertained via at least one further bijective transformation function, which are assigned, via the at least one transformation function, to the ascertained image regions or subregions of the produced image, and using the correction algorithm for generating the corrected image to be output, in each case at least one image-region parameter is ascertained via the at least one further bijective transformation function only for the ascertained image regions of the corrected image to be output.

6. The method as recited in claim 1, wherein the at least one transformation function is selected via the correction algorithm from a plurality of stored transformation functions depending on at least one ambient condition of the output unit, and/or at least one output parameter of the output unit, and/or at least one image parameter of the produced image or of the corrected image to be output.

7. The method as recited in claim 1, wherein a frequency for executing the correction algorithm to generate corrected images to be output is determined depending on a number of subregions, changing within a time interval, of produced images and/or image regions of produced images.

8. The method as recited in claim 1, wherein the at least one image produced and/or transmitted to the output unit is stored, only a portion of the image regions forming the image being selected and stored when storing the image, and in at least one further method step, the stored image is assembled using the selected portion and using an interpolation of the image regions forming the portion.

9. The method as recited in claim 1, wherein, independently of the correction algorithm, at least one operator is applied to at least one transformation function depending on at least one user input, and/or at least one position, stored via the transformation function, of one image region of a produced image or of a corrected image, and/or at least one change, stored via the transformation function, of one image-region parameter of at least one image region of a corrected image being set.

10. A smart-glasses system, comprising:
an arithmetic logic unit; and
at least one micro-electromechanical output unit including smart glasses;
wherein the arithmetic logic unit is configured to compensate for projection errors when outputting images, the arithmetic unit configured to:
produce at least one image,
transmit the image produced or an image to be output to the at least one micro-electromechanical output unit, and
before the image is output by the output unit, execute a correction algorithm to generate, from the produced image, a corrected image to be output, each respective image region of image regions of the corrected image to be output that are to be generated using the correction algorithm being assigned at least one stored position within the produced image via at least one stored transformation function each depending on a position within the corrected image to be output, and at least one image-region parameter being ascertained for the image regions to be generated each depending on the stored position assigned to the respective image region to be generated.

11. The system as recited in claim 10, further comprising:
at least one wireless or cabled communication unit, the arithmetic logic unit and the output unit being formed separately from each other and being communicatively connected to each other via the communication unit, the arithmetic logic unit being equipped to transmit generated corrected images to be output, to the output unit.

12. A non-transitory computer-readable medium on which is stored a computer program including commands to compensate for projection errors when outputting images using a smart-glasses system, the commands, when executed by an arithmetic logic unit, causing the arithmetic logic unit to perform the following step:
producing at least one image;
transmitting the image produced or an image to be output by the arithmetic logic unit to at least one micro-electromechanical output unit including smart glasses of the system; and
before the image is output by the output unit, executing a correction algorithm to generate, from the produced image, a corrected image to be output, each respective image region of image regions of the corrected image to be output that are to be generated using the correction algorithm being assigned at least one stored position within the produced image via at least one stored transformation function each depending on a position within the corrected image to be output, and at least one image-region parameter being ascertained for the image regions to be generated each depending on the stored position assigned to the respective image region to be generated.

* * * * *